United States Patent
Bryant et al.

(10) Patent No.: US 6,631,095 B1
(45) Date of Patent: Oct. 7, 2003

(54) SEISMIC CONDUCTIVE ROPE LEAD-IN CABLE

(75) Inventors: Michael John Bryant, Houston, TX (US); Nick C. George, Sugarland, TX (US)

(73) Assignee: PGS Exploration (US), Inc., Houston, TX (US)

( * ) Notice: Subject to any disclaimer, the term of this patent is extended or adjusted under 35 U.S.C. 154(b) by 0 days.

(21) Appl. No.: 09/350,200

(22) Filed: Jul. 8, 1999

(51) Int. Cl.[7] .................................................. H01B 7/00
(52) U.S. Cl. ...................................... 367/20; 174/113 R
(58) Field of Search ............................ 367/20, 122, 16; 350/96.23; 174/113 R, 105; 340/310; 385/100, 112; 114/253

(56) References Cited

U.S. PATENT DOCUMENTS

| | | | |
|---|---|---|---|
| 2,180,731 A | * 11/1939 | Dickinson | 174/105 |
| 3,261,907 A | * 7/1966 | Morrison | 174/115 |
| 3,978,446 A | 8/1976 | Miller | 340/7 R |
| 4,156,869 A | * 5/1979 | Schukantz | 340/310 A |
| 4,317,185 A | 2/1982 | Thigpen et al. | 367/15 |
| 4,528,650 A | 7/1985 | Howlett et al. | 367/79 |
| 4,726,315 A | * 2/1988 | Bell et al. | 114/244 |
| 4,756,268 A | 7/1988 | Gjestrum et al. | 114/242 |
| 5,408,947 A | * 4/1995 | Curto et al. | 114/253 |
| 5,455,881 A | * 10/1995 | Bosisio et al. | 385/100 |
| 5,835,450 A | 11/1998 | Russell | 367/20 |
| 6,069,841 A | * 5/2000 | Johnston | 367/20 |
| 6,088,499 A | * 7/2000 | Newton et al. | 385/112 |

FOREIGN PATENT DOCUMENTS

EP 0 577 467 A1 1/1994

* cited by examiner

Primary Examiner—Edward Lefkowitz
Assistant Examiner—Victor J. Taylor

(57) ABSTRACT

A conductive rope-like lead-in cable connects a seismic streamer to a towing vessel. The lead-in cable comprises a first electrical conductor at the center core of the cable for carrying a first polarity of power to the streamer for providing tensile strength to the load-in cable. A first layer of insulation surrounds the first electrical conductor. A second electrical conductor for a second polarity of power to the streamer surrounds the first layer of insulation. A second layer of insulation surrounds the second electrical conductor. A layer of seismic data conductors surrounds the second layer of insulation. A third layer of insulation surrounds the layer of seismic data conductors. A metallic protective layer surrounds the third layer of insulation. Steel is effectively and efficiently used both to provide tensile strength and for electrical power conduction.

37 Claims, 2 Drawing Sheets

SEISMIC CONDUCTIVE ROPE LEAD-IN CABLE

TECHNICAL FIELD OF THE INVENTION

The present invention relates to lead-in cables for connecting seismic streamers to a towing vessel and for transmitting seismic data from the streamers to data processing equipment aboard the vessel and, more particularly, is concerned with a low-cost, small diameter conductive rope-like lead-in cable having improved performance characteristics.

BACKGROUND OF THE INVENTION

Lead-in cables are used at the front end of the towed seismic streamer spread to connect each streamer to the towing vessel. Lead-in cables are also used by the military at the front end of the towed seismic arrays used for locating other vessels at sea. The lead-in cable carries electrical power to the streamers (or seismic arrays) and seismic data from the streamers (or arrays) to data processing equipment aboard the towing vessel. In either of these applications, the lead-in cable must withstand the mechanical forces generated by movement of the vessel and towed streamers (or arrays) through the seawater.

Lead-in cables are usually terminated at their vessel end inside each storage reel and at their sea end with mechanical terminations capable of transferring loads through the system. They are stored and deployed from both fixed and slewing winches. Therefore, the details of these terminations and arrangements vary from installation to installation.

Normally, current seismic cables are constructed as a central assembly containing electrical and/or optical components around which steel armor wires are helically wrapped to provide both mechanical protection from cutting or bending, etc. and tensile strength. In some instances, the overall tensile strength of these cables is in excess of 120,000 pounds force (lbf.) to cope with the loads they are expected to experience in service. Loads are generated as the result of drag on the streamers, vibration of the lead-in cable resulting from vortex shedding, motion transmitted from the deflectors or doors used to achieve the separation of streamers, and inertial effects within the towing arrangement.

During normal service when towing, lead-in cables tow reasonably close to the water surface. However, the cables may sink if, for example, the vessel stops or the cable is severed. For this reason, the sea end terminations are sealed to prevent the ingress of water into the termination and electrical inserts that would result in loss of electrical integrity.

FIG. 1 illustrates the cross-section of a conventional lead-in cable in present use. Such a cable typically contains copper or copper alloy power and seismic data conductors bundled or twisted together to form an inner core. As illustrated, the core is mechanically protected by a layer of helically wrapped steel armor wire and by a non-metallic outer jacket. Copper is typically used instead of steel for the electric conductors in seismic cables because the electrical resistivity of copper is approximately one-fortieth ($1/40^{th}$) to one-sixth ($1/6^{th}$) that of steel. However, in comparison with steel, copper conductors elongate more easily and distort at lower elongation values, or under compressive loading. Therefore, to achieve the required tensile strength, a relatively high factor of safety must be used for present cables comprised of primarily copper conductors. The tensile strength factor of safety for a seismic cable is the ratio of breaking load to working load. A factor of safety of 4:1 is typically used in present cables with copper conductors. A large safety requires correspondingly large gauge and diameter cable components, which increase the cable weight, overall diameter, and cost in comparison with a cable designed to a lower safety factor.

More recently, electro-optic cables have been introduced to the seismic exploration fleet in which the main multiplexed data transmission lines have been replaced with fiber optic lines to reduce the weight, and, more importantly, the diameter of the lead-in cable. FIG. 2 illustrates the cross-section of a typical electro-optic lead-in cable. As seen, the use of fiber-optic transmission lines results in a significant reduction in overall cable diameter. However, the use of copper power cores in these cables still requires a relatively high tensile strength factor of safety to ensure against cable distortion and damage in seismic operations.

The use of a lower factor of safety would reduce the overall diameter, weight, and cost of a lead-in cable. In addition, a lighter weight and smaller diameter cable advantageously permits an increase of the separation distance between the streamers towed behind the vessel. A smaller diameter lead-in cable is also advantageous because problems associated with fluid drag and vortex shedding increase with cable diameter.

Consequently, a need still exists in the seismic exploration industry and in the navy fleet for a small diameter, lightweight lead-in cable. Preferably, such a lead-in cable will contain little or no copper and can therefore be designed to a lower tensile strength factor of safety than present lead-in cables. Such a lead-in cable will preferably also be simple and inexpensive to manufacture and have an extended life expectancy. Ideally, such a lead-in cable can be designed to incorporate either fiber optic or conventional seismic data conductors.

SUMMARY OF THE INVENTION

The present invention addresses the aforementioned needs. According to one aspect of the invention, a lead-in cable for connecting a seismic streamer or towed array to a towing vessel is provided. The lead-in cable comprises a first electrical conductor at the center core of the cable for carrying a first polarity of power to the streamer. A first layer of insulation surrounds the first electrical conductor. A second electrical conductor for carrying a second polarity of power to the streamer surrounds the first layer of insulation. A second layer of insulation surrounds the second electrical conductor. A layer of seismic data conductors for carrying seismic data signals from the streamer surrounds the second layer of insulation. A metallic protective layer surrounds the layer of seismic data conductors for providing cut resistance to the lead-in cable. The second electrical conductor, the first and second layers of insulation, the layer of seismic data conductors, and the metallic protective layer are all concentrically disposed about the longitudinal axis of the first electrical conductor at the center core of the lead-in cable.

In a further aspect of the invention, a non-metallic protective layer surrounds the metallic protective layer of the lead-in cable.

In a more specific aspect of the invention, the non-metallic protective layer surrounding the metallic protective layer comprises thermoplastic polymer.

In a further aspect of the invention, a third layer of insulation is disposed between the layer of seismic data conductors and the metallic protective layer.

According to another aspect of the invention, the seismic data conductors comprise fiber optic cables.

According to an alternative embodiment of the invention, the seismic data conductors comprise signal core conductors.

In a further aspect of the invention, the first and second electrical conductors for carrying a first and second polarity of power, respectively, to the streamer comprise a metal selected from the group consisting of steel, copper clad steel, titanium alloy, or other high strength metal other than copper.

In another aspect of the invention, the metallic protective layer for providing cut resistance to the lead-in cable comprises a metal selected from the group consisting of steel, aluminum, copperweld, or other high strength metal other than copper.

According to another embodiment of the invention, a lead-in cable for connecting a seismic streamer or towed array to a towing vessel is provided. The lead-in cable comprises a first electrical power conductor for carrying a first polarity of power to the streamer. A second electrical power conductor for carrying a second polarity of power to the streamer surrounds and contains the first power conductor. A plurality of seismic data conductors for carrying seismic data signals from the streamer surrounds and contains at least one of the first and second electrical power conductors. Means is provided for electrically insulating the first and second power conductors from one another and from the seismic data conductors. Means for providing cut resistance to the lead-in cable is also provided.

In a further aspect of the invention, the means for electrically insulating the first and second power conductors from one another and from the seismic data conductors comprises a first layer of electrical insulation disposed between the first and second electrical power conductors, and a second layer of electrical insulation disposed between the seismic data conductors and the adjacent power conductor.

In a more specific aspect of the invention, the electrical insulation layers comprise thermoplastic polymer.

In another aspect of the invention, the means for providing cut resistance to the lead-in cable comprises a metallic protective layer surrounding and containing the plurality of seismic data conductors.

A still further aspect of the invention includes means for providing corrosion resistance to the lead-in cable.

In a more specific aspect of the invention, the means for providing corrosion resistance to the lead-in cable comprises a non-metallic protective jacket surrounding and containing the means for providing cut resistance to the cable.

In a still more specific aspect of the invention, the non-metallic protective jacket comprises thermoplastic polymer.

In another aspect of the invention, a method is provided for making a lead-in cable for connecting a seismic streamer or towed array to a towing vessel. The method comprises placing a first layer of insulation over the surface of a first electrical conductor, placing a second electrical conductor over the surface of the first insulation layer, placing a second layer of insulation over the second electrical conductor, placing a layer of seismic data conductors over the surface of the second insulation layer; and providing cut resistance to the lead-in cable.

In a further aspect of the invention, the step of providing cut resistance to the lead-in cable comprises covering the seismic data conductors with a metallic protective layer.

In a more specific aspect of the invention, the metallic protective layer comprises a plurality of wires wound helically around the outer periphery of the seismic data conductors.

An alternative aspect of the invention includes the step of covering the metallic protective layer with a non-metallic protective jacket.

In a more specific aspect of the invention, the step of covering the metallic protective layer with a non-metallic protective jacket comprises extruding a thermoplastic polymer layer over the metallic protective layer.

In a further aspect of the invention, the first and second layers of insulation are placed over the first and second electrical conductors, respectively, by the process of extrusion.

In a still further aspect of the invention, the second electrical conductor comprises a plurality of wires, and is placed over the surface of the first insulation layer by winding the wires of the second electrical conductor helically around the first insulation layer.

In a still further aspect of the invention, the layer of seismic data conductors is placed over the surface of the second insulation layer by winding the seismic data conductors helically around the second insulation layer.

In a still further aspect of the invention, the method for making a lead-in cable further includes the step of placing a third layer of insulation over the layer of seismic data conductors before providing cut resistance to the lead-in cable.

According to another aspect of the invention, a method is provided for towing a seismic streamer or towed array from a floating vessel. The method comprises providing a pair of elongated structural members for securing the seismic streamer or towed array to the vessel, providing a first polarity of electrical power to the streamer through one of the pair of elongated structural members, providing a second polarity of electrical power to the streamer through the other one of the pair of elongated structural members, and providing seismic data conductors in association with the pair of elongated structural members for carrying seismic data signals from the streamer to the vessel.

In another aspect of the invention, the method includes electrically insulating the elongated structural members from one another and from the seismic data conductors.

In a further aspect of the invention, the method includes providing cut resistance to the pair of elongated structural members and the seismic data conductors.

In a more specific aspect of the invention, the step of providing cut resistance to the pair of elongated structural members and the seismic data conductors comprises providing a metallic protective layer over the outermost one of the structural members and the seismic data conductors.

An alternative embodiment of the invention includes providing corrosion resistance to the pair of elongated structural members and the seismic data conductors.

In a more specific aspect of the invention, the step of providing corrosion resistance to the pair of elongated structural members and the seismic data conductors comprises providing a non-metallic protective jacket over the metallic protective layer.

BRIEF DESCRIPTION OF THE DRAWINGS

For a more complete understanding of the present invention, and the advantages thereof, reference is now made to the following Detailed Description of the Invention taken in conjunction with the accompanying drawings, in which.

DETAILED DESCRIPTION OF EXAMPLE EMBODIMENTS OF THE INVENTION

Figure 4:
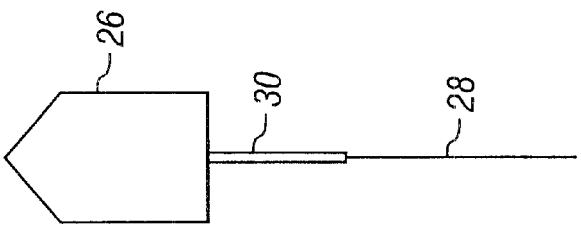
FIG. 4 is a plan view of a floating vessel towing a seismic streamer by a lead-in cable

The preferred embodiment of the present invention and its advantages are best understood by referring to the drawings, like numerals being used for like and corresponding parts of the various drawings.

Figure 3:
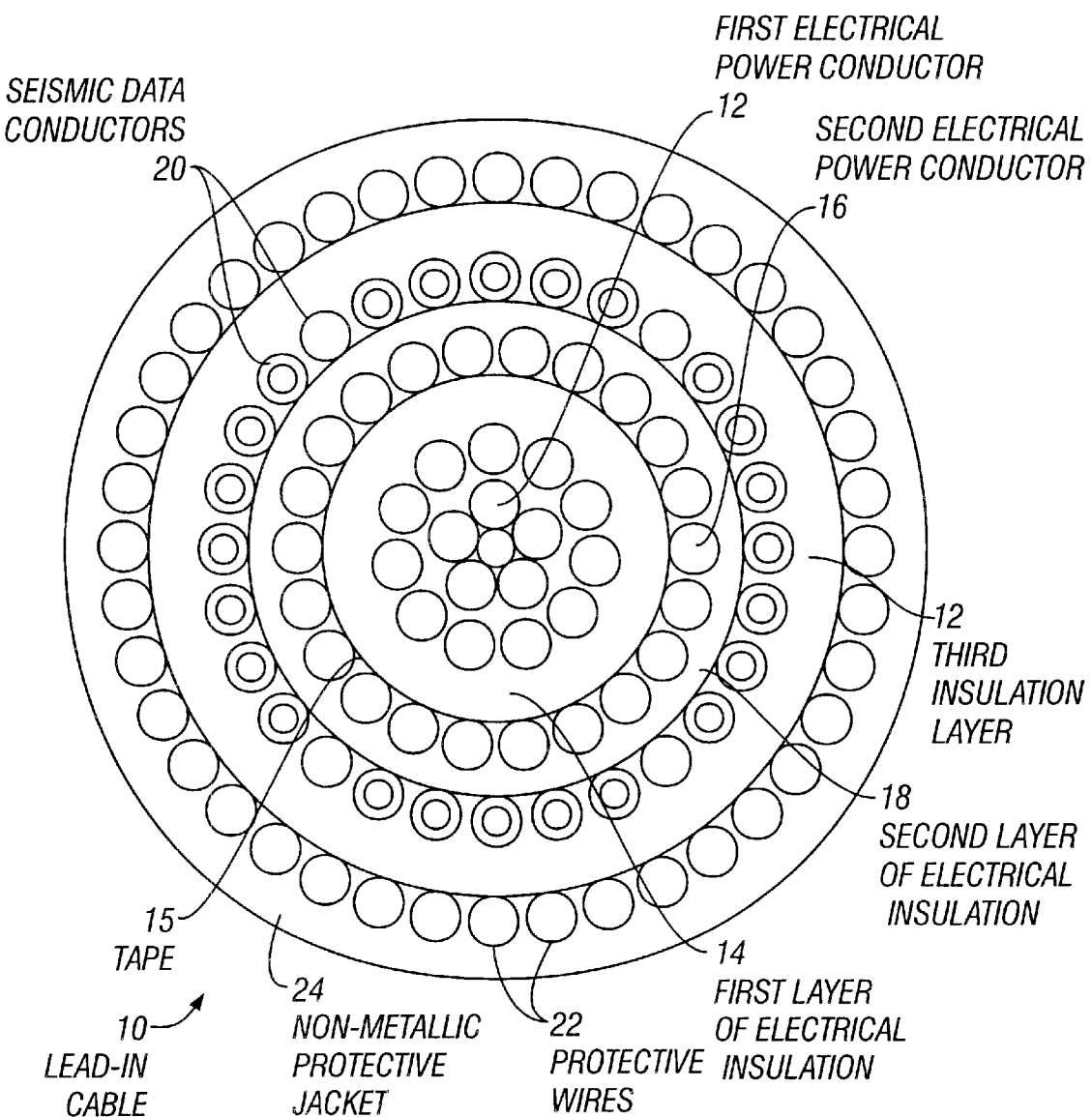
FIG. 3 is a cross-sectional view of a seismic lead-in cable of the present invention.

In FIG. 3 an example embodiment of the invention is shown in cross-sectional view. A lead-in cable, generally designated 10, includes a first electrical power conductor 12 at the center core, which carries a first polarity of power to the streamer (or towed array). First power conductor 12 is overlaid with and enclosed by a first layer of electrical insulation 14. First layer of electrical insulation 14 is covered by an overlapping wrap of metallic or fiber reinforced tape 15. A plurality of electrically conductive wires making up a second electrical power conductor 16 for carrying a second polarity of power to the streamer are wound helically around the taped first insulation layer 14. Second power conductor 16 is overlaid with and enclosed by second layer of electrical insulation 18. A plurality of seismic data conductors 20 for carrying seismic data signals from the streamer are placed over the outer surface of the second layer of electrical insulation 18. Seismic data conductors 20 include electrical signal core conductors and/or fiber optic cables. In other embodiments, fiber optic cables, as used in present lead-in cables, are combined with conductors 20 or substituted for conductors 20. Seismic data conductors 20 are wound helically around second insulation layer 18. Seismic data conductors 20 are overlaid with and enclosed by third insulation layer 21.

A plurality of protective wires 22 are wound helically around the outer periphery of third insulation layer 21 to provide a metallic protective layer, additional strength, cut resistance, and torque resistance to lead-in cable 10. However, if there is sufficient strength in power conductors 12 and 16 and seismic data conductors 20, protective wires 22 may be omitted for some applications. In an optional embodiment, protective wires 22 are overlaid with and enclosed by a non-metallic protective jacket 24 to provide corrosion resistance to the lead-in cable. As seen in FIG. 3, the first insulation layer 14, second power conductor 16, second insulation layer 18, layer of seismic data conductors 20, third insulation layer 21, layer of protective wires 22, and, if used, non-metallic protective jacket 24, are all concentrically arranged about the longitudinal axis of first power conductor 12 at the center core of lead-in cable 10.

In various embodiments, first power conductor 12 comprises a single, heavy-gauge wire or a plurality of lighter gauge wires twisted or bundled together, as illustrated in FIG. 3. First and second power conductors 12 and 16, respectively, are manufactured of galvanized improved plow steel in some embodiments, while in other embodiments they comprise copper clad steel or a titanium alloy or other high strength metal other than copper. Electrical signal core conductors 20 are manufactured of copper clad steel or steel, and are electrically insulated in the well known manner. Fiber optic cables 20 are manufactured of single-mode or multi-mode armored optical fiber.

Also in the illustrated embodiment, first, second, and third insulation layers 14, 18, and 21, respectively, are placed over the first and second electrical conductors 12 and 16 and seismic data conductors 20, respectively, by the process of extrusion, and comprise medium density polyethelene or other polymer or thermoplastic material. Protective wires 22 are also manufactured of steel in various embodiments, and, in other embodiments, comprise aluminum, copperweld, or other high strength metal other than copper. Copperweld is used to modify the electrical resistance of metallic protective layer 22. Non-metallic protective jacket 24, if used, is placed over protective wires 22 in the illustrated embodiment by any variety of processes (for example, extrusion) and comprises medium density polyethelene or other polymer or thermoplastic material.

Figure 2:
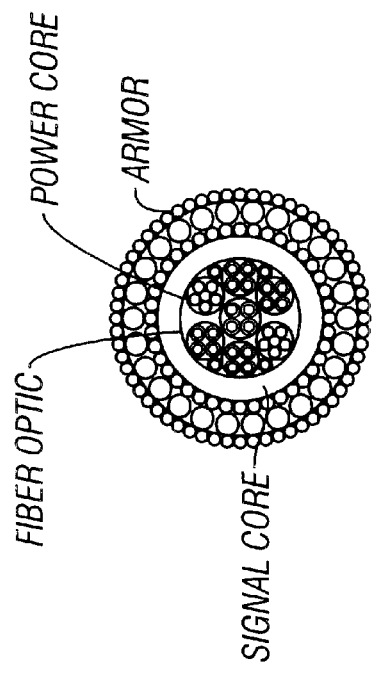
FIG. 2 is a cross-sectional view of an electro-optic lead-in cable of the prior art having one or more fiber optic seismic data conductors.
Figure 1:
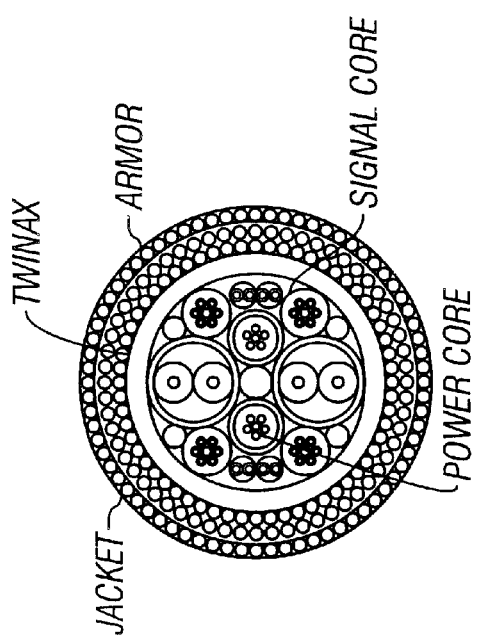
FIG. 1 is a cross-sectional view of a seismic lead-in cable of the prior art having conventional electrical seismic data conductors.

By comparing the cross-sectional area of the steel armor wire to that of the copper conductors in FIGS. 1 and 2, it is apparent that the volume of steel in present lead-in cables far exceeds the volume of copper conductors. Present electro-optic lead-in cables, for example, include approximately 22.5 square millimeters of copper conductor and 530 square millimeters of steel armor wire in their cross-sections. The embodiment shown in FIG. 3 redistributes and uses much of the non-electrically conducting steel in present lead-in cables for the power conductors, thus eliminating all or much of the copper from the cable without sacrificing tensile and compressive strength. The steel is effectively and efficiently used in the present invention both to provide tensile strength and for electrical power conduction, notwithstanding the higher resistivity of steel in comparison to copper conductors. It should also be noted that the layer of seismic data conductors 20 of the illustrated embodiment replaces both the twinax and the signal cores of conventional lead-in cables. Furthermore, the illustrated cable is essentially a "conductive rope." Therefore, semi-standard rope termination methods may be used to attach the cable end to the streamers.

In still a further alternative embodiment, protective wires 22 are used as seismic signal conductors in addition to their function in providing mechanical cut resistance to the cable.

In another alternative embodiment, at least some of the protective wires 22 are used as electrical ground for seawater return use.

In yet another alternative embodiment, first and second power conductors 12 and 16, respectively, and/or protective wires 22 are replaced by a metallic braid, stranded steel, or other electrically conductive material of sufficient tensile strength.

There are several advantages obtained by the lead-in cable of the illustrated embodiment of FIG. 3. First, the cable contains little or no copper and therefore has a lower material cost. However, copper conductors or copper clad steel wires are included in alternative embodiments if necessary for special applications, or to adjust electrical resistivity. Second, the cable has a lower ratio between breaking and working load due to the reduction or elimination of copper. Therefore, a lower factor of safety may be used in the design of the cable. Third, the cable is smaller in diameter than presently used cables. In fact, an embodiment with a non-metallic protective jacket 24 has approximately the same outer diameter as an unjacketed cable in present use. The non-metallic protective jacket 24 provides corrosion resistance in the embodiment of the invention in which it is used. Fourth, the cable is relatively simple and inexpensive to manufacture. It has fewer components than present cables and requires fewer operations to manufacture. In some embodiments, the cable is made with a cabling machine alone, without the necessity of stranding and twisting components together. Fifth, fiber optic cords are easily included in further embodiments.

The illustrated embodiment of lead-in cable 10 is manufactured as follows: First power conductor 12 has a single 'king' wire at its center around which five preformed steel wires are wound to make the first wire layer of power conductor 12. Eleven additional preformed wires are then wound around the five wire layer to make a second and final wire layer in power conductor 12. The direction of lay and the number of conductor wires in power conductor 12 may vary from the illustrated embodiment to achieve electrical resistance and mechanical load carrying and torque resistance requirements.

In one embodiment, each wire of power conductors 12 and 16 is preformed into a helical shape that is the same size or preferably slightly smaller in internal diameter to the outer diameter of the preceding cable layer prior to being applied to the assembly. Preforming ensures that the wires hold tightly together and makes the lead-in cable 10 easier to terminate by reducing the tendency for the wires to open out when the cable 10 is cut.

After first power conductor 12 is made, first insulation layer 14 is extruded over conductor 12, followed by an overlapping wrap of metallic or fiber reinforced tape. The tape is applied to help distribute the compressive load from the next layer of wrapped wires evenly over the surface of insulation layer 14.

The individual wires of second power conductor 16 are then wound over the taped first insulation layer, again choosing the direction of lay and number of wires to achieve both electrical resistance and mechanical load carrying and torque resistance requirements. Then, second insulation layer 18 is extruded over the assembly to complete the power portion of cable 10.

Seismic data conductors 20 are then wound onto the previous assembly. Third insulation layer 21 is then extruded over the layer of seismic data conductors. If used, protective wires 22 are then wrapped over third insulation layer 21. If used, protective jacket 24 is then extruded over protective wires 22. Finally, in one embodiment, a hairy fairing is then applied over the finished lead-in cable 10 for reducing strumming of cable 10 when dragged through the water by the survey vessel.

The seismic lead-in cable of the present invention, and many of its intended advantages, will be understood from the foregoing description of example embodiments, and it will be apparent that, although the invention and its advantages have been described in detail, various changes, substitutions, and alterations may be made in the manner, procedure, and details thereof without departing from the spirit and scope of the invention, as defined by the appended claims, or sacrificing all of its material advantages, the form hereinbefore described being exemplary embodiment thereof.

What is claimed is:

1. A lead-in cable for connecting a seismic streamer to a towing vessel, comprising:
    a first electrical conductor for carrying a first polarity of power to the streamer and for providing tensile strength to the lead-in cable, the first electrical conductor being at the center core of the lead-in cable;
    a first layer of insulation surrounding the first electrical conductor;
    a second electrical conductor for carrying a second polarity of power to the streamer and for providing tensile strength to the lead-in cable, the second electrical conductor surrounding the first layer of insulation;
    a second layer insulation surrounding the second electrical conductor; and
    a layer of seismic data conductors for carrying seismic data signals from the streamer, the layer of seismic data conductors surrounding the second layer of insulation;
    whereby the second electrical conductor, the first and second layers of insulation, the layer of seismic data conductors are all concentrically disposed about the longitudinal axis of the first electrical conductor at the center core of the lead-in cable.

2. The lead-in cable of claim 1, further comprising a metallic protective layer surrounding the layer of seismic data conductors for providing cut resistance to the lead-in cable.

3. The lead-in cable of claim 2, further comprising a non-metallic protective layer surrounding the metallic protective layer of the lead-in cable.

4. The lead-in cable of claim 3, wherein the non-metallic protective layer surrounding the metallic protective layer comprises thermoplastic polymer.

5. The lead-in cable of claim 2, further including a third layer of insulation disposed between the layer of seismic data conductors and the metallic protective layer.

6. The lead-in cable of claim 1, wherein the seismic data conductors comprise fiber optic cables.

7. The lead-in cable of claim 1, wherein the seismic data conductors comprise signal core conductors.

8. The lead-in cable of claim 1, wherein the first and second electrical conductors for carrying a first and second polarity of power, respectively, to the streamer comprise a metal selected form the group consisting of steel, copper clad steel, or titanium alloy.

9. The lead-in cable of claim 2, wherein the metallic protective layer for providing cut resistance to the lead-in cable comprises a metal selected from the group consisting of steel, aluminum, and copperweld.

10. A lead-in cable for connecting a seismic streamer to a towing vessel, comprising:
    a first electrical conductor for carrying a first polarity of power to the streamer and for providing tensile strength to the lead-in cable;
    a second electrical power conductor for carrying a second polarity of power to the streamer and for providing tensile strength to the lead-in cable, the second power conductor surrounding and containing the first power conductor;
    a plurality of seismic data conductors for carrying seismic data signals from the streamer, the plurality of seismic data conductors surrounding and containing at least one of the first and second electrical power conductors; and
    means for electrically insulating the first and second power conductors from one another and from the seismic data conductors.

11. The lead-in cable of claim 10, further including means for providing cut resistance to the lead-in cable.

12. The lead-in cable of claim 10, wherein the means for electrically insulating the first and second power conductors from one another and from the seismic data conductors comprises:
    a first layer of electrical insulation disposed between the first and second electrical power conductors; and
    a second layer of electrical insulation disposed between the seismic data conductors and the adjacent power conductor.

13. The lead-in cable of claim 12, wherein the electrical insulation layers comprise thermoplastic polymer.

14. The lead-in cable of claim 11, wherein the means for providing cut resistance to the lead-in cable comprises a metallic protective layer surrounding and containing the plurality of seismic data conductors.

15. The lead-in cable of claim 11, further including means for providing corrosion resistance to the lead-in cable.

16. The lead-in cable of claim 15, wherein the means for providing corrosion resistance to the lead-in cable comprises a non-metallic protective jacket surrounding and containing the means for providing cut resistance to the cable.

17. The lead-in cable of claim 16, wherein the non-metallic protective jacket comprises thermoplastic polymer.

18. A method of making a lead-in cable for connecting a seismic streamer to a towing vessel, which comprises:
    placing a first layer of insulation over the surface of a first electrical conductor, wherein said electrical conductor provides tensile strength to the lead in cable;
    placing a second electrical conductor over the surface of the first insulation layer;
    placing a second layer of insulation over the second electrical conductor; and
    placing a layer of seismic data conductors over the surface of the second insulation layer.

19. The method of claim 18, further including the step of providing cut resistance to the lead-in cable.

20. The method of claim 19, wherein the step of providing cut resistance to the lead-in cable comprises covering the seismic data conductors with a metallic protective layer.

21. The method of claim 20, wherein the metallic protective layer comprises a plurality of wires, and wherein the wires are wound helically around the outer periphery of the seismic data conductors.

22. The method of claim 20, further including the step of covering the metallic protective layer with a non-metallic protective jacket.

23. The method of claim 22, wherein the step of covering the metallic protective layer with a non-metallic protective jacket comprises extruding a thermoplastic polymer layer over the metallic protective layer.

24. The method of claim 18, wherein the first and second layers of insulation are placed over the first and second electrical conductors, respectively, by the process of extrusion.

25. The method of claim 18, wherein the second electrical conductor comprises a plurality of wires, and wherein the second electrical conductor is placed over the surface of the first insulation layer by winding the wires of the second electrical conductor helically around the first insulation layer.

26. The method of claim 18, wherein the layer of seismic data conductors is placed over the surface of the second insulation layer by winding the seismic data conductors helically around the second insulation layer.

27. The method of claim 19, further including the step of placing a third layer of insulation over the layer of seismic data conductors before providing cut resistance to the lead-in cable.

28. A method of towing a seismic streamer from a floating vessel, which comprises:
    providing a pair of elongated structural members for securing the seismic streamer to the vessel and for providing tensile strength;
    providing a first polarity of electrical power to the streamer through one of the pair of elongated structural members;
    providing a second polarity of electrical power to the streamer through the other one of the pair of elongated structural members; and
    providing seismic data conductors in association with the pair of elongated structural members for carrying seismic data signals from the streamer to the vessel.

29. The method of claim 28, further including electrically insulating the elongated structural members from one another and from the seismic data conductors.

30. The method of claim 29, further including providing cut resistance to the pair of elongated structural members and the seismic data conductors.

31. The method of claim 30, wherein the step of providing cut resistance to the pair of elongated structural members and the seismic data conductors comprises providing a metallic protective layer over the outermost one of the structural members and the seismic data conductors.

32. The method of claim 31, further including providing corrosion resistance to the pair of elongated structural members and the seismic data conductors.

33. The method of claim 32, wherein the step of providing corrosion resistance to the pair of elongated structural members and the seismic data conductors comprises providing a non-metallic protective jack over the metallic protective layer.

34. A lead-in cable for connecting a seismic streamer to a towing vessel, comprising:
    a seismic data conductors for carrying seismic data signals from the streamer; and
    electrical conductors for carrying electrical power to the streamer and for providing tensile strength to the lead-in cable, the electrical conductors comprising a metal selected from the group consisting of steel, copper clad steel, or titanium alloy, wherein:
        the electrical conductors comprise a first power conductor for carrying a first polarity of power to the streamer and a second power conductor for carrying a second polarity of power to the streamer;
        the second power conductor surrounds and contains the first power conductor;
        the seismic data conductors surround and contain at least one of the first and second power conductors; and
        means is provided for electrically insulating the first and second power conductors from one another and from the seismic data conductors.

35. The lead-in cable of claim 34, wherein:
    the electrical conductors for carrying electrical power to the streamer comprise a first power conductor for carrying a first polarity of power to the streamer and a second power conductor for carrying a second polarity of power to the streamer;
    the second power conductor surrounds and contains the first power conductor;
    the seismic data conductors surround and contain at least one of the first and second power conductors; and
    means is provided for electrically insulating the first and second power conductors from one another and from the seismic data conductors.

36. The lead-in cable of claim 34, further including a metallic protective layer surrounding and containing the seismic data conductors for providing cut resistance to the lead-in cable.

37. The lead-in cable of claim 36, further including a non-metallic protective jacket surrounding and containing the metallic protective layer for providing corrosion resistance to the lead-in cable.

* * * * *